United States Patent [19]
George et al.

[11] Patent Number: 4,661,612
[45] Date of Patent: Apr. 28, 1987

[54] METHOD FOR PURIFYING SILICONE OIL

[75] Inventors: Ulf George, Ulm; Erwin Rochau, Elchingen; Hans Merk, Ulm-Goegglingen; Joachim Behnke, Elchingen, all of Fed. Rep. of Germany

[73] Assignee: Licentia Patent-Verwaltungs-GmbH, Frankfurt am Main, Fed. Rep. of Germany

[21] Appl. No.: 797,649

[22] Filed: Nov. 13, 1985

[30] Foreign Application Priority Data

Nov. 13, 1984 [DE] Fed. Rep. of Germany ....... 3441353
Mar. 8, 1985 [DE] Fed. Rep. of Germany ....... 3508219
Sep. 25, 1985 [DE] Fed. Rep. of Germany ....... 3534218

[51] Int. Cl.$^4$ .............................................. C07F 7/08
[52] U.S. Cl. .................................... 556/450; 556/453; 556/456; 556/466

[58] Field of Search ................ 556/466, 456, 453, 450

[56] References Cited

U.S. PATENT DOCUMENTS 4,127,598 11/1978 McEntee .......................... 556/466 X
4,156,689 5/1979 McEntee .......................... 556/466 X Primary Examiner—Paul F. Shaver
Attorney, Agent, or Firm—Spencer & Frank

[57] ABSTRACT

A method for purifying silicone oil used particularly as a cooling and/or insulation agent in electrical high voltage devices. The silicone oil is purified by the addition of drying agents, e.g. molecular sieves, and adsorption agents, e.g. activated carbon, and by mechanically moving the mixture. After subsequent sedimentation, filtration and degasification, purified silicone oil is obtained which can again be used as a coolant and/or insulating agent.

9 Claims, No Drawings

METHOD FOR PURIFYING SILICONE OIL

BACKGROUND OF THE INVENTION

The present invention relates to a method for purifying silicone oil.

The present invention can be used, in particular, for silicone oil which is employed as electrical insulation and for cooling electrical high voltage devices. Such a silicone oil should be free of impurities so that the highest possible dielectric strength exists, e.g. greater than 60 kV/2.5 mm. In such use, almost unavoidable impurities have the result that, after a certain period of operation, the dielectric strength drops, e.g. to a value of about 15 kV/2.5 mm. Such impure silicone oil has the disadvantage that it results in operating malfunctions or even in destruction of the high voltage device in which it is used.

It is obviously possible to replace impure silicone oil with new silicone oil, from which merely the gases, e.g. air, dissolved therein have been removed, e.g. by heating at reduced atmospheric pressure (vacuum). Such a method is not cost effective and is therefore uneconomical.

As an alternative, attempts have been made to purify impure silicone oil by so-called vacuum distillation. Such purification is impeded in an uneconomical manner or even prevented by extensive foam formation.

SUMMARY OF THE INVENTION

It is therefore an object of the present invention to provide an economically feasible method for purifying silicone oil which is to be used primarily as a cooling and/or insulating agent in electrical devices.

This and other objects are realized by the present invention in a process for purifying silicone oil so as to remove impurities contained therein, comprising:
adding a drying agent and an adsorption agent to the silicone oil;
causing the drying agent and the adsorption agent to act on the silicone oil during a reaction period which depends on the desired purity of the silicone oil;
at the end of the reaction period, separating the drying agent and the adsorption agent from the silicone oil; and
after the step of separating, heating the silicone oil in a vacuum to remove dissolved gasses.

A first advantage of the present invention is that it offers a viable alternative to destroying or disposing of impure silicone oil, which is uneconomical and damaging to the environment.

A second advantage is that only inexpensive process steps are required to purify the impure silicone oil.

The invention is based essentially on the realization that silicone oil is made impure essentially by organic substances, suspended matter, water and the already mentioned gases, e.g. air.

The invention will now be described in greater detail with reference to preferred embodiments.

DESCRIPTION OF THE PREFERRED EMBODIMENTS

Impure silicone oil is initially extracted from an exemplary high voltage device and collected in a vessel. The silicone oil, which is normally colorless, has a yellow tint, caused by impurities, and a dielectric strength of about 15 kV/2.5 mm. To this impure silicone oil are now added a drying agent and adsorption agent. The drying agent may contain materials such as an 0.3 nm alumino-silicate molecular sieve or another known type of molecular sieve and/or a silica gel and/or activated aluminum oxide. The quantity of drying agent added is a few grams per liter of silicone oil to be purified and its dosage depends on the water content of the silicone oil. Activated carbon and/or activated fuller's earth are used as adsorption agents for the removal of organic impurities. The quantity of adsorption agent added is a few grams per liter of silicone oil to be purified.

Mechanical movement, e.g. stirring and/or shaking, avoids premature sedimentation of the drying agent and/or of the adsorption agent. After a reaction time depending on the desired purity of the purified silicone oil, e.g. eight hours, the mechanical movement is terminated. Then sedimentation of the drying and adsorption agents takes place. The silicone oil disposed thereabove is extracted, e.g. after standing for a period of 2 to 3 days, and is purified further by means of several filtering processes employing pressure. The filters employed for this purpose have pore sizes in a range from 1 $\mu$m to 0.3 $\mu$m.

The silicone oil purified in this manner is subsequently degassed by heating, e.g. to 50° C. to 110° C., and preferably 95° C., in a vacuum. The vacuum is generated by means of a socalled prevacuum pump and is at a level of about 0.1 Torr.

The thus treated silicone oil is colorless and has a dielectric strength equal to or greater than 60 kV/2.5 mm and is therefore suitable for the above-mentioned uses as a cooling and/or insulating agent.

According to a further embodiment, a solid adsorption agent, e.g. fuller's earth and/or activated carbon, and a solid drying agent, e.g. silica gel, are initially added to the silicone oil to be purified, which is intended for cooling and/or electrical insulation in electrical high voltage devices. The drying agent here serves merely to preliminarily dry the silicone oil. After a certain reaction period, e.g. eight hours, in which the silicone oil is moved mechanically, the solid adsorption agent and the solid drying agent are removed, e.g. by means of a filtering and/or sedimentation process.

Thereafter, an extremely dry inert gas, e.g. nitrogen and/or a noble gas, is introduced into the thus prepurified silicone oil. This is done, for example, with the aid of at least one glass feeder pipe having a so-called frit at its end with which finely dispersed gas bubbles are produced. With a quantity of about 50 to 100 liters of silicone oil to be dried, approximately 500 to 5000 liters of inert gas per hour are required for a drying duration of about four to 8 hours.

It is now of particular advantage to use gaseous nitrogen as the inert gas. Such gaseous nitrogen is manufactured from presently inexpensively available liquid nitrogen, e.g. by heating. A thus produced gaseous nitrogen is free of interfering impurities, e.g. machine oil, and has an extremely low moisture content, e.g. less than 0.1 ppm water. This gaseous nitrogen is now heated, e.g. to a temperature of between 20° C. and 80° C., and preferably approximately 30° C., and is conducted through the prepurified silicone oil until the water content of the latter has dropped to a value of less than or equal to 1 ppm.

It may be advisable to degas the thus dried silicone oil by heating it in a vacuum.

Silicone oil processed in this manner has a dielectric strength of approximately 80 kV/2.5 mm. This was measured by means of a spherical cap as specified in the presently applicable German Standard VDE No. 0370/10.66.

The invention is not limited to the described embodiments but can also be used otherwise. For example, it is possible to use the noble gas helium instead of gaseous nitrogen.

Since helium is presently a very expensive noble gas, it is uneconomical to effect drying of the silicone oil solely by passing helium through it.

It is therefore advantageous to dry the silicone oil initially in the above-described manner by conducting gaseous nitrogen through it. It has been found that some N2 remains in the silicone oil after this process in a concentration of approximately 0.17 cm$^3$/g silicone oil. In the past, this dissolved quantity of N$_2$ had to be removed by a vacuum treatment since, particularly if there were changes in temperature and pressure, gas bubbles form in the exemplarily mentioned high voltage devices, with electrical breakthrough tending to occur at the location of these gas bubbles. To overcome this drawback, it is advisable, for reasons of economy, to follow the N$_2$ drying process by conducting gaseous, dry helium, which is possibly likewise heated, through the silicone oil. This essentially expels the remainder of N$_2$. A helium (He) remainder is left which, however, has a much lower concentration than the remainder of N$_2$ which would be present in the absence of the helium treatment.

It is further possible to excite the silicone oil by ultrasound during the N$_2$ drying process and/or during the subsequent passage of helium gas therethrough. This produces large N$_2$ and/or He gas bubbles which escape by rising up in the silicone oil. The amount of gas that would then remain is not troublesome. If this remaining gas is also to be removed, vacuum degassing is required. However, this process does not take much time and is therefore economical, the time required depending on the desired concentration of any remaining gas.

EXAMPLE 1 100 l of silicone oil, e.g. polydimethylsiloxane, are contaminated with 200 ppm of water and 1000 ppm of organic materials. This impure silicone oil is filled in a rotable barrel. To this impure silicone oil are added:

1 kg of 0.3 μm alumino-silicate molecular-sieve as drying agent 1 kg of fuller's earth as adsorption agent to remove organic materials which cause the colour, e.g. yellow, of the impure silicone oil and 0.5 kg of activated carbon to remove colour 0.5 kg of activated carbon to remove smell as adsorption agents.

This mixture is rotated with a speed of about 10 revolutions/minute for about 8 hours to get a thorough mixing and to prevent sedimentation of the adsorption agent and the drying agent.

After stopping the rotation of the barrel, sedimentation is allowed to proceed for at least 3 days. The nearly clear silicone oil is removed from the sediment by pumping and is pumped through a first filter with a pore size of 1 μm to 2 μm and then through a second filter with a pore size of about 0.45 μm. For degassing and additional drying this silicone oil is heated to 95° C. in a vakuum of about 0.1 Torr for about 10 hours.

The thus treated silicone oil has a dielectric strength of 62 kV/2.5 mm.

EXAMPLE 2

100 l of silicone oil, e.g. plydimethylsiloxane, are contaminated with 80 ppm of water an 500 ppm of organic materials. To this impure silicon oil is added 0.5 kg of activated carbon to remove colour and 0.5 kg of activated carbon to remove smell as adsorption agents.

Now stirring is done by blowing dry nitrogen through the impure silicone oil at a rate of about 2000 l/h for a time of about two hours. After stopping, the nitrogen flow sedimentation of the activated carbon is allowed for at least 3 days. The nearly clear silicone oil is removed by pumping from the sediment and is pumped through a first filter with a pore size of 1 μm to 2 μm and then through a second filter with a pore size of about 0.45 μm. Now, extremly dry gaseous nitrogen is blown through the silicone oil for about 24 hours with a blowing rate of about 2000 l/h and with a temperature of about 25° C. This N$_2$-blowing causes drying of the silicone oil to a H$_2$O-concentration of less than 5 ppm. Further drying is achievable by increasing the flow-rate.

After this drying process, residual N$_2$ at a concentration of about 0.17 cm$^3$N$_2$/g silicone oil remains in the silicone oil. This dissolved N$_2$ is now removed by blowing gaseous dry helium for about 2 hours through the silicone oil.

The helium has a temperature of about 25° C. and a flow-rate of about 500 l/h. The time of the degassing process can be lowered by appling ultrasound of a frequency of about 42 kHz to the silicone oil. After this degassing, the silicone oil has a dielectric strength of about 80 kV/2.5 mm. Remaining dissolved helium is removable by vacuum degassing for about one hour at a temperature of about 20° C. and a pressure of about 0.1 Torr.

It will be understood that the above description of the present invention is susceptible to various modifications, changes and adaptations, and the same are intended to be comprehended within the meaning and range of equivalents of the appended claims.

What is claimed is:

1. Process for purifying silicone oil to remove impurities contained therein, comprising:
    adding a drying agent and an adsorption agent to the silicone oil, said adsorption agent selected from the group consisting of activated carbon and activated fuller's earth and said drying agent selected from the group consisting of molecular sieves, silica gel and activated aluminum oxide;
    causing the drying agent and the adsorption agent to act on the silicone oil during a reaction period effective to attain a desired purity of the silicone oil and conducting a low water vapor inert gas through said silicone oil during the reaction period;
    at the end of the reaction period, separating the drying agent and the adsorption agent from the silicone oil; said separation step comprising a sedimentation process and a filtering process.

2. Process for purifying silicone oil as defined in claim 1 wherein said step of causing comprises maintaining the silicone oil in movement for preventing sedimentation of at least one of the agents.

3. Process for purifying silicone oil as defined in claim 1 wherein said step of heating is carried out at a temperature which lies in a range from 50° C. to 110° C.

4. Process for purifying silicone oil as defined in claim 3 wherein said step of heating is carried out at a temperature of 95° C.

5. Process for purifying silicone oil as defined in claim 1 wherein the inert gas is gaseous nitrogen generated by heating liquid nitrogen.

6. Process for purifying silicone oil as defined in claim 1 wherein the inert gas is nitrogen and further comprising, before said step of conducting, heating the nitrogen to a temperature which lies in a temperature range from 20° C. to 80° C.

7. Process for purifying silicone oil as defined in claim 1 wherein the inert gas has a water content less than 0.1 ppm and said step of conducting is carried out until the water content of the silicone oil has been reduced to a value of less than 1 ppm.

8. Process for purifying silicone oil as defined in claim 1 wherein the inert gas is gaseous nitrogen, and said step of separating comprises conducting gaseous helium through the silicone oil to remove remaining nitrogen.

9. Process for purifying silicone oil as defined in claim 1 wherein the inert gas is gaseous nitrogen and said step of separating comprises ultrasonically exciting the silicone oil to remove remaining nitrogen.

* * * * *